(12) United States Patent
Morris et al.

(10) Patent No.: US 7,185,316 B1
(45) Date of Patent: Feb. 27, 2007

(54) VISUALLY ORIENTED COMPUTER IMPLEMENTED APPLICATION DEVELOPMENT SYSTEM UTILIZING STANDARDIZED OBJECTS AND MULTIPLE VIEWS

(76) Inventors: Robert M. Morris, P.O. Box 105, 1275 Westtown Thornton Rd., Westtown, PA (US) 19395; Leet E. Denton, III, 2215 Panama St., Philadelphia, PA (US) 19103

( * ) Notice: Subject to any disclaimer, the term of this patent is extended or adjusted under 35 U.S.C. 154(b) by 0 days.

(21) Appl. No.: 09/184,738

(22) Filed: Nov. 2, 1998

Related U.S. Application Data

(63) Continuation of application No. 08/340,702, filed on Nov. 16, 1994, now Pat. No. 5,862,372.

(51) Int. Cl.
*G06F 9/44* (2006.01)

(52) U.S. Cl. .................. 717/116; 717/108; 717/135; 715/769; 715/763

(58) Field of Classification Search ............... 717/1, 717/2, 3, 5, 10, 11, 116, 105, 125, 108, 135; 345/433, 335; 715/839, 769, 763, 704
See application file for complete search history.

(56) References Cited

U.S. PATENT DOCUMENTS

| | | | | |
|---|---|---|---|---|
| 5,187,788 | A | * | 2/1993 | Marmelstein ............... 717/109 |
| 5,303,379 | A | * | 4/1994 | Khoyi et al. ................ 717/166 |
| 5,408,659 | A | * | 4/1995 | Cavendish et al. ......... 717/107 |
| 5,481,706 | A | * | 1/1996 | Peek .......................... 710/240 |
| 5,481,712 | A | * | 1/1996 | Silver et al. .................... 717/1 |
| 5,485,618 | A | * | 1/1996 | Smith ............................. 717/1 |
| 5,613,058 | A | * | 3/1997 | Koppolu et al. ............ 715/744 |
| 5,619,637 | A | * | 4/1997 | Henshaw et al. ........... 715/835 |
| 5,630,131 | A | * | 5/1997 | Palevich et al. ............ 717/108 |

(Continued)

FOREIGN PATENT DOCUMENTS

JP 5197506 A1 * 1/1992

(Continued)

OTHER PUBLICATIONS

Gurewich et al., Master Visual Basic 3, Jul. 20, 1994, Sams Publishing, Chapters 14, 15, 19, 20.*

(Continued)

*Primary Examiner*—Todd Ingberg
(74) *Attorney, Agent, or Firm*—Laurence Weinberger

(57) ABSTRACT

A computer implemented application development (authoring) system permits objects (such as VBX custom controls) to be graphically inserted into the program under development by dragging and dropping associated icons into one of four views. The properties associated with the object may than be assigned settings. Development of a complete application is accomplished by visually arranging, ordering, and interconnecting the objects without the necessity of writing any code. The four views of Output, Map, Multitrack, and Workform may be synchronized so that changes made to the program in one view are simultaneously reflected in all other views. The system generates as output a script listing the objects and their properties which is then executed by a separate run time program. The system permits use of objects written to a standard specification and the addition at any time of additional objects written to that. Integration of the objects into the system is achieved by wrapping each object is an "envelope" of system specific properties.

54 Claims, 6 Drawing Sheets

U.S. PATENT DOCUMENTS

| | | | | | |
|---|---|---|---|---|---|
| 5,652,884 | A | * | 7/1997 | Palevich | 713/1 |
| 5,680,619 | A | * | 10/1997 | Gudmundson et al. | 717/1 |
| 5,740,439 | A | * | 4/1998 | Atkinson et al. | 719/320 |
| 5,917,498 | A | * | 6/1999 | Korenshtein | 345/433 |
| 5,937,189 | A | * | 8/1999 | Branson et al. | 717/1 |
| 6,023,271 | A | * | 2/2000 | Quaeler-Bock et al. | 345/335 |
| 6,237,135 | B1 | * | 5/2001 | Timbol | 717/1 |

FOREIGN PATENT DOCUMENTS

JP          6202840 A1 * 12/1992

OTHER PUBLICATIONS

"Visual Object-Oriented Programming Concepts and Environments", Margaret M. Burnett et al., pp. 1-274, 1995.*

Star Graphics: An Object-Oriented Implementation, Dr. Daniel E. Lipkie et al, ACM, 1982, pp. 115-124.*

"Display Item Selection Visual Indicators", Anonymous, Research Disclosure, Dec. 1991, 2 pages.*

"The Xerox Star Resprospective", Jeff Johnson et al, 27 pages, Sep. 1989, "http://members.dcn.org/dwnelson, XeroxStarReprospective.html".*

"Visual Languages: A Tutorial and Survey", IEEE Software, S.K. Chang, Jan. 1987, 11 pages.*

"Influence of Visual Technology on the Evolution of Language Environments", IEEE Computer, A.L.Ambler et al, Oct. 1989, 14 pages.*

"Visual Programming, Programming by Example and Program Visualization: A Taxonomy", B. A. Myer, Apr. 1986, 8 pages.*

"Visual Programming Language: A Perspective and a Dimensional Anayksis", S.K. Chang et al, Visual Languages, 1986, 18 pages.*

Object-Oriented Information Systems Planning and Implementation, David A Taylor, Apr. 10, 1992, pp. 1-357.*

OSF/Motif Programmer's Reference, Open Software Foundation, Release 1.2 1993, Whole Book, Located in Case Artifact file.*

Microsoft OLE Control Developer's Kit User's Guide & Reference Version 2.0, Microsoft Press, 1994, Whole Book, Located in Case Artifact file.*

Using OLE 2.X in Application Development, Que, 1994, Whole Book, Located in Case Artifact file.*

Heavy Metal OLE 2.0 Programming, Steve Holzner, 1994, Whole Book, Located in Case Artifact file.*

Drag And Drop from the Finder, Dave Evans and Greg Robbins, Dec. 1993, The Apple Technical Journal Develop, Issue 16, pp. 66-75, Magazine located in Artifact folder.*

Building Powertalk-Savvy Applications, Steve Falkenburg, Dec. 1993, The Apple Technical Journal Develop, Issue 16, pp. 39-63, Magazine located in Artifact folder.*

ObjectVision 2.0 Devloper's Guide, Borland, Allen G. Taylor, 1992, Whole Book, Located in Case Artifact file.*

* cited by examiner

PRIOR ART

| | Type | Filename | Label | BranchTo | WaitFor | Comment |
|---|---|---|---|---|---|---|
| 1 | V_GraphPIX | D:\BMP\HORSE.BMP | | | 0 | |
| 2 | V_GraphPIX | | | | 0 | |
| 3 | V_GraphTXT | | | | 0 | |
| 4 | V_GraphTXT | | | | 0 | |
| 5 | V_GraphBTN | | | V_GraphBTN 1 | 0 | |
| 6 | V_GraphPIX | | V_GraphPIX 1 | V_GraphWRK 1 | 0 | |
| 7 | V_GraphBTN | | V_GraphBTN 1 | | 0 | |
| 8 | V_GraphTXT | | | | 0 | |
| 9 | V_GraphWRK | | V_GraphWRK 1 | | | |
| 10 | | | | | | |
| 11 | | | | | | |

Figure 4

VISUALLY ORIENTED COMPUTER IMPLEMENTED APPLICATION DEVELOPMENT SYSTEM UTILIZING STANDARDIZED OBJECTS AND MULTIPLE VIEWS

This is a continuation application of U.S. application Ser. No. 08/340,702 filed on Nov. 16, 1994 now U.S. Pat. No. 5,862,372 for which a notice of allowance was issued on Jan. 7, 1998. A software appendix is attached to this application. A portion of the disclosure of this patent document contains material which is subject to copyright protection. The copyright owner has no objection to the facsimile reproduction for non-infringing purposes by anyone of the patent document or the patent disclosure, as it appears in the Patent and Trademark Office patent file or records, but otherwise reserves all copyright rights whatsoever.

FIELD OF THE INVENTION

This invention relates to the use of a computer implemented application development process, and, more specifically, to an authoring system and its associated run time system which permits the creation of an application (program) in which standardized objects are incorporated into the application without the necessity of the user having knowledge any programming language or programming script, and in which the application development process can be monitored (observed, evaluated, etc.) through the multiple synchronized views of output display, timing sequence, logical relationships, and script workform.

BACKGROUND OF THE INVENTION

The last ten years has seen an explosive growth in the development of digital computer systems and technology both in the processing power and of the hardware systems and in the sophistication of the controlling software. Not only has the microprocessor become a ubiquitous incident to almost every laboratory, industrial, and household appliance, but many functions once assigned to combinations of moving parts are almost invariably now preformed by digitally controlled electronics. Systems as diverse as automobile ignition systems and home turntables now share a common electronic heritage. In fact, the performance of many electronic circuits can be equally implemented by hardware or by a digital computer under software control. In many instances the software component of the digital electronics has become enormously complex and correspondingly expensive to develop. Indeed, the cost of the electronic hardware has come down so far that the development time and cost of the software is now the limiting element in the introduction and pricing of many new systems. There has developed, therefore, a great need to reduce the cost and time of software development.

The development over the past three years of what is referred to as "multimedia" computer systems has increased the complexity of the required software as the systems access, simultaneously present, and then replace vast amounts of information. Present systems are directed toward the simultaneous presentation of audio and visual output, but systems are clearly on the horizon which will present coordinated output which can be sensed by all five human senses and create a virtual reality. While present systems access the information for multimedia presentation primarily from local magnetic and optical storage media, it is foreseeable that electronic and optical communication with the world through the coming "information superhighway" will provide a rich source of interactive multimedia In an attempt to reduce the cost and complexity of developing sophisticated software, attempts have been made over the last few years to modularize software functions with the idea that such modularized software could then be integrated into larger systems to achieve more complex functions. Each piece (object) of modularized software would consist of a set of instructions designed to perform a specific type of task which was frequently required in a more complex program. To use the objects, no knowledge of their internal coding structure would be necessary. All that would be required is to provide the modules with the information (parameters) they required for their use. Thus, applications would be built by selecting appropriate software modules and assembling/ordering/sequencing them to achieve higher order functions. This is the essential goal of "object oriented programming". It quickly became apparent that building with modularized software would not be efficient unless the presentation of the modules themselves conformed to some form of standard; ie., flat bricks of any material can be stacked, mixed flat and curved bricks, no matter what material they are made of, do not stack well. A second problem facing object oriented programming is that efficiencies of application construction would only be achieved when the assembly of the objects did not require extensive and complex programming itself.

Several attempts have been made, therefore, to develop visually oriented programming systems in which software modules are manipulated as icons which may be arranged/ordered as needed and interconnected with logical operators. Examples of this can be found in the NeXT application development system, in the VIP Macintosh program, and in PowerBuilder, a Microsoft Windows program. Generally, in these types of application development systems, the software modules or objects are presented on a palette from which they are selected and "dragged" into the application under development. Ideally, in these systems, the software instructions needed to integrate the objects into a functioning whole (corresponding to the visual representation or map) are provided by the authoring program system. In reality, most of the prior art systems require the user to write some of the interconnecting software code either in a common higher order language or in a language specialized to that program.

It was hoped that the demand for complex and varied software imposed by multimedia programming requirements could be efficiently addressed by the use of object oriented programming. Until the present invention, these hopes have not been realized. A major problem not solved by the prior art has been the inability to handle in one visual, non-scripted, application development system the diverse requirements of different types of data required by a multimedia program in appropriate visual interfaces.

For instance, during the authoring process a view of the output generated by the application under development is useful when dealing with visual output (images). However, such a view is much less useful for dealing with audio output since, clearly, audio can not be seen. Correspondingly, a time line view in which the elements of the application program are represented by graphs plotting the relative times and sequences of presentation is much more useful for audio. Similarly, a logical map (flowchart paradigm), which visually relates the sequence and logical interconnections of each program element (visual, audio, etc.) is very useful for designing and following the basic structure of the application program. Sometimes, for quickly manipulating or editing particular parts of the developed application code, it is more useful to be able to view the program in a text view and treat the underlying script like a text document. Not only should the application development system provide, at any given moment, a view appropriate to the type of multimedia material being utilized, but such views should be able to be synchronized so that changes made in one view are instantly reflected in all the others.

Prior art application development programs do not have the flexibility to present all four views, much less in a synchronized manner. Programs are available which are optimized for output view, map view, timeline view, and script view. Some permit more than one view with some synchronization. However, no prior art program permits access to all four synchronized views. In particular, no prior art program has successfully overcome the difficulty of simultaneously synchronizing the time line view to the other views.

Additionally, in an optimum visual, object oriented, application development program there should be available a wide variety of objects (software modules that would manipulate in different manners multimedia output) with the ability to easily add additional objects, developed by independent programmers, to the development system. Each added object should seemlessly be integrated so that it is available in all four views. Programs of the prior art each have their own object definition standards. That is, for an object to be incorporated into their system, it must meet that program's standards. No prior art program is available which will allow addition of objects not designed to its standard without the necessity of writing additional code to perform the interface to that object. Finally, it should be noted that application development systems necessarily consist of two major parts. The first is the authoring section which provides a customized output (script). The second is a run time system which takes the customized output and executes it. Some prior art run time systems for visually developed applications are notoriously slow in their execution.

SUMMARY OF THE INVENTION

The present invention overcomes the limitations of the prior art. First, the system can be used to author applications using an entirely visual programming scheme (paradigm) which does not require the user to know or be able to write any specialized code. Icons representing the objects (and accordingly their functionalities) may be placed (dragged) into an appropriate view. The system of the invention generates the information needed by the run time program. Second, during authoring, the user can access all four views which can be synchronized or not at the user's choice, and these views are available in overlapping windows. The user may, thus, work in the view most appropriate to the type of object the user is manipulating. Third, the objects which are available on the palette, can be added or subtracted from the development program with great ease. While the present implementation of the invention is designed to directly operate standardized Microsoft Visual Basic VBX controls as objects, the manner in which the invention wraps the objects is equally usable with objects written to standards other than the Microsoft VBX control. Fourth, the invention is capable of utilizing any objects written to a standard specification. That is, at its core it is featureless and extensible. The invention imposes no limitation on the type of function the objects can perform, and the objects need not be directed towards multimedia or any other single use. Thus, all types of programs can be developed utilizing the entire range of available objects, and, during application development, the objects may all be presented in the four views, once again synchronized or not. Fifth, a run time program is provided which executes the output of the authoring program much faster than the run time programs of the prior art. These, and other advantages of the invention will become apparent from the description of the invention which follows.

BRIEF DESCRIPTION OF THE FIGURES

FIG. 4 shows a Workform view of a simple program.

DETAILED DESCRIPTION OF THE INVENTION

Definitions

Figure 1:
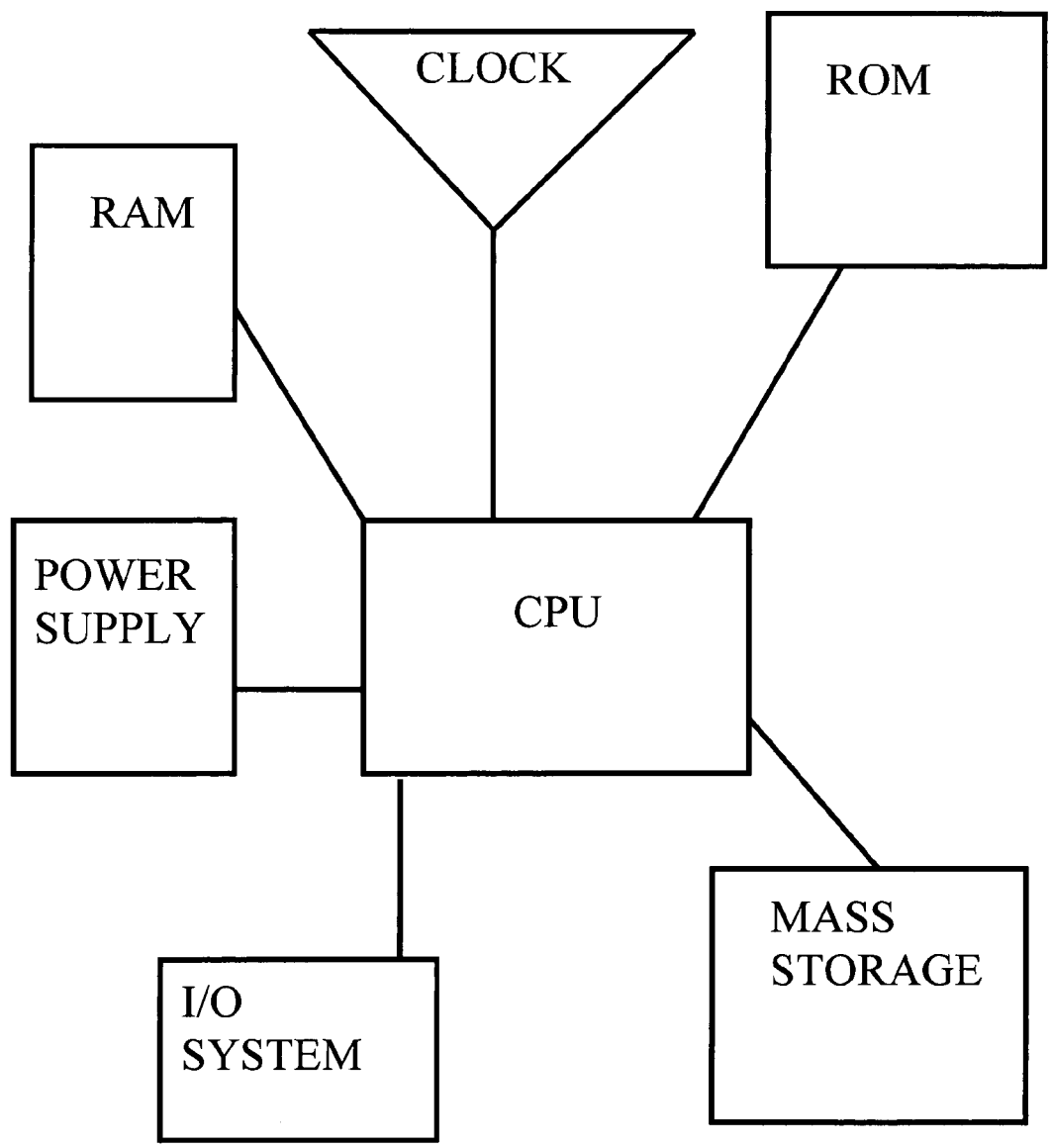
FIG. 1 shows a schematic representation of the major components of a modern programmable digital computer.

In order to avoid the confusion often present in the world of computer jargon, for purposes of this application, the following terms shall have the meanings set forth below:

"APPLICATION" shall mean an end product computer program which is ready for use by its intended audience.

"CODE" shall mean a series of specialized words and symbols in a particular syntax which must be entered through a keyboard and which is then converted to a machine readable form.

"OBJECT" shall mean a modular software program written to a defined specification which may perform any function. For purposes of this application, the word "OBJECT" shall be considered synonymous with the term "custom control". Objects are intended to be grouped and assembled into applications.

"SCRIPT" shall mean a set of computer instructions written at a higher level than code ie., farther removed from machine language, which is usually interpreted during execution. "SCRIPT" for purposes of this application shall also refer to the listing of objects and property settings generated by the authoring program of this invention.

"SYSTEM" shall mean the computer implemented application development system of this invention.

"WINDOWS" (when appearing in all capital letters) shall mean the Microsoft operating system of the same name without regard to the version number.

The present invention is an integrated computer implemented application development system which permits the user to create custom applications without writing a line of computer code. The ability to do just this has existed as a dream since computers moved into the public imagination and the dream is fulfilled by this invention. The invention provides a fully visual programming environment in which the user can create powerful WINDOWS applications in hours that would take days or weeks using standard programming languages. When describing the process implemented by a non-authoring computer system, it is generally sufficient to describe the process steps carried out and their order. However, authoring programs create an environment with many potentialities within which the user works to develop the application. To describe authoring programs it is necessary to describe the environment. Consider the analogy to building a house. The environment provides the tools (hammers, nails, saws, lumber, wires, pipes, etc.) as well as ways of looking at the house under construction (architectural plans, outside drawings, kitchen layouts, etc). Once the environment contains all the tools and views needed, the user can construct the house according to his/her own needs by assembling the parts.

This description of the computer implemented application development system will briefly: 1) describe the environment created by the present invention; 2) describe the process of using the system to create applications; 3) describe the manner in which the system creates a script corresponding to the program elements and how that script is used by the run time program; and 4) describe how the system coordinates objects and permits additional objects to be added easily. A complete description of the invention is contained in the source code provided in the software appendix which is attached to this application.

FIG. 1 is a block diagram showing the basic functional units of a modern digital computer with which the computer implemented applications development system of the invention works. Information may be stored on magnetic or optical media for access or be available through a connection to a remote information source. During the development of an application with the system of this invention, the user directs the incorporation of objects into one of the four views, modifies the properties associated with that object, and interconnects the objects so chosen. The user may direct the machine to accomplish these tasks using a pointer (such as a mouse) or a keyboard and visually observes his/her actions on the system's output display. As the system responds to the user's directions, it creates a script representing the application being developed by the user. When the development process is complete, the user stores the script on one of the system's storage devices.

One of the interesting features of the object oriented authoring system of this invention is that no traditional looking code, written in a programming language, is generated by the system. Rather, the output of the authoring system is a listing of the objects in order of appearance (in the program sequence) along with the properties associated with that object at that place in the sequence. The properties are the information or settings which specify to the object how it will perform. The computer implemented application development system records the settings for the objects and the order of execution of the objects in an output script. Thus, the system operates only at the object level. As the author proceeds in developing the application, the system adds to the script.

Figure 2:
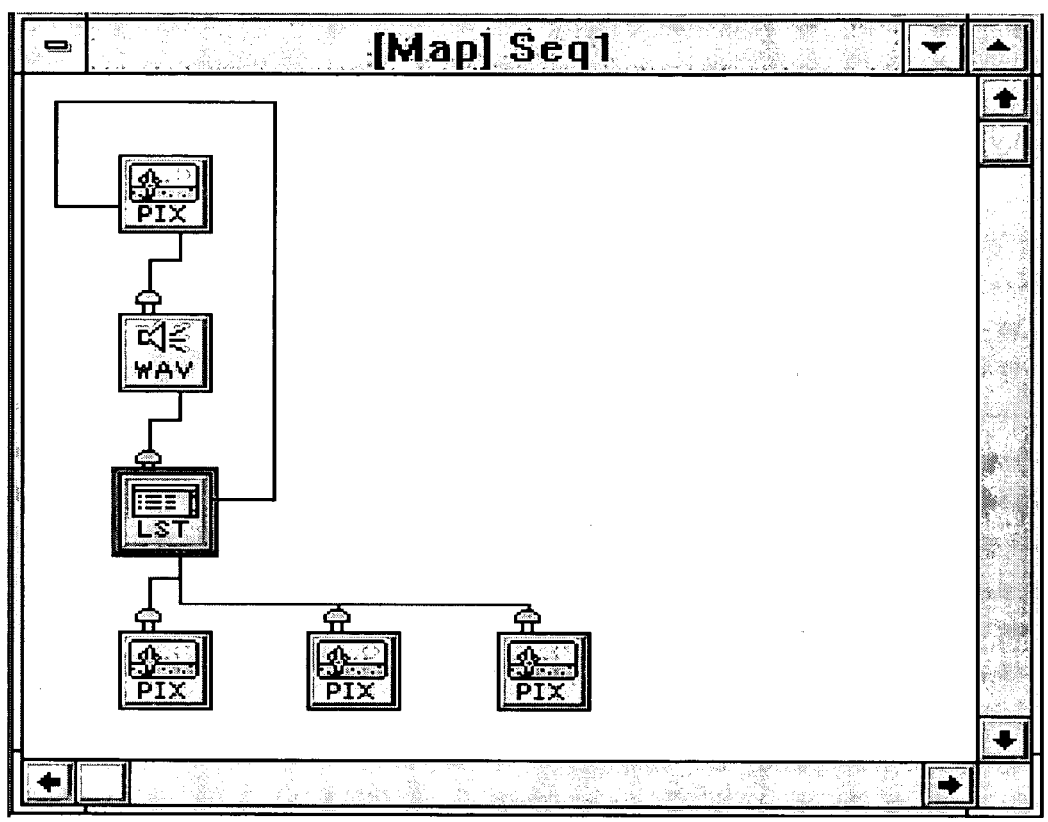
FIG. 2 shows a Map view of a simple program.

The four views are different ways to make and look at the same script. Each has its own special perspective and strength. FIG. 2 shows a Map view of a simple program in which the flow of the program and the flow of data is displayed. The Map view displays a block diagram in which the authored program is viewed as the sequence in which the objects are utilized, the branches which are taken, and the flow of data between the objects. The system not only allows the passing of data back and forth between different objects, but allows objects to affect each other in other ways as well. The Map view is best for seeing and building the program using a flowchart metaphor. Thinking of the program in this way can be very useful when building interactive applications since this view presents a way to see the flow of data between objects which can save hours of debugging time.

When a Map window is opened, the system generates the Map view directly from the underlying script.

The Output view displays the screen output of the objects and is best for working directly with the product of the script. In this view you see the output of each object you incorporate into the program. When an Output view window is opened, the system generates the Output view directly from the underlying script.

Figure 3:
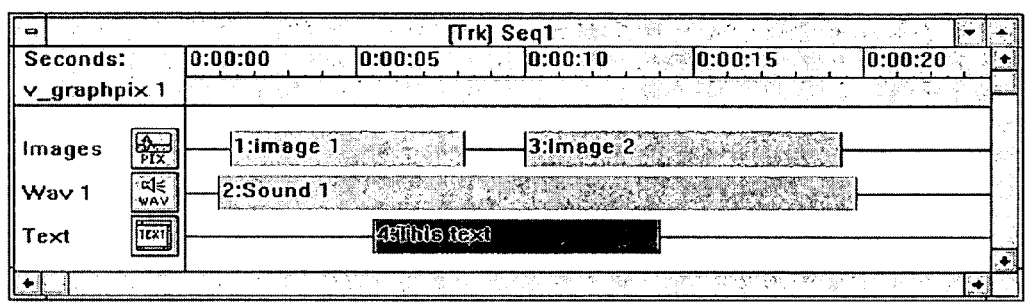
FIG. 3 shows a Multitrack view of a simple program.

FIG. 3 shows a Multitrack view of a simple program in which the timing sequences of object presentation are displayed. The Multitrack view is limited to coordinating and timing the appearance, disappearance, and activities of the objects. It is different from the other views because it is not a view of just any part of the script (program), it only views timed sections. This view is useful for creating parts of the application that require objects to be created and destroyed at specific times. The Multitrack view automatically sets all the special properties that differentiate the objects in these time sections form the objects in other parts of the application (script).

FIG. 4 shows a Workform view of a simple program where each object and its associated properties is displayed in each row. The Workform view displays the underlying script directly and permits treating it like a text document. The script can be viewed in as little or as much detail as is necessary. This view has word processing features so that it becomes easy to make global changes, and to copy and move blocks of information.

Figure 5:
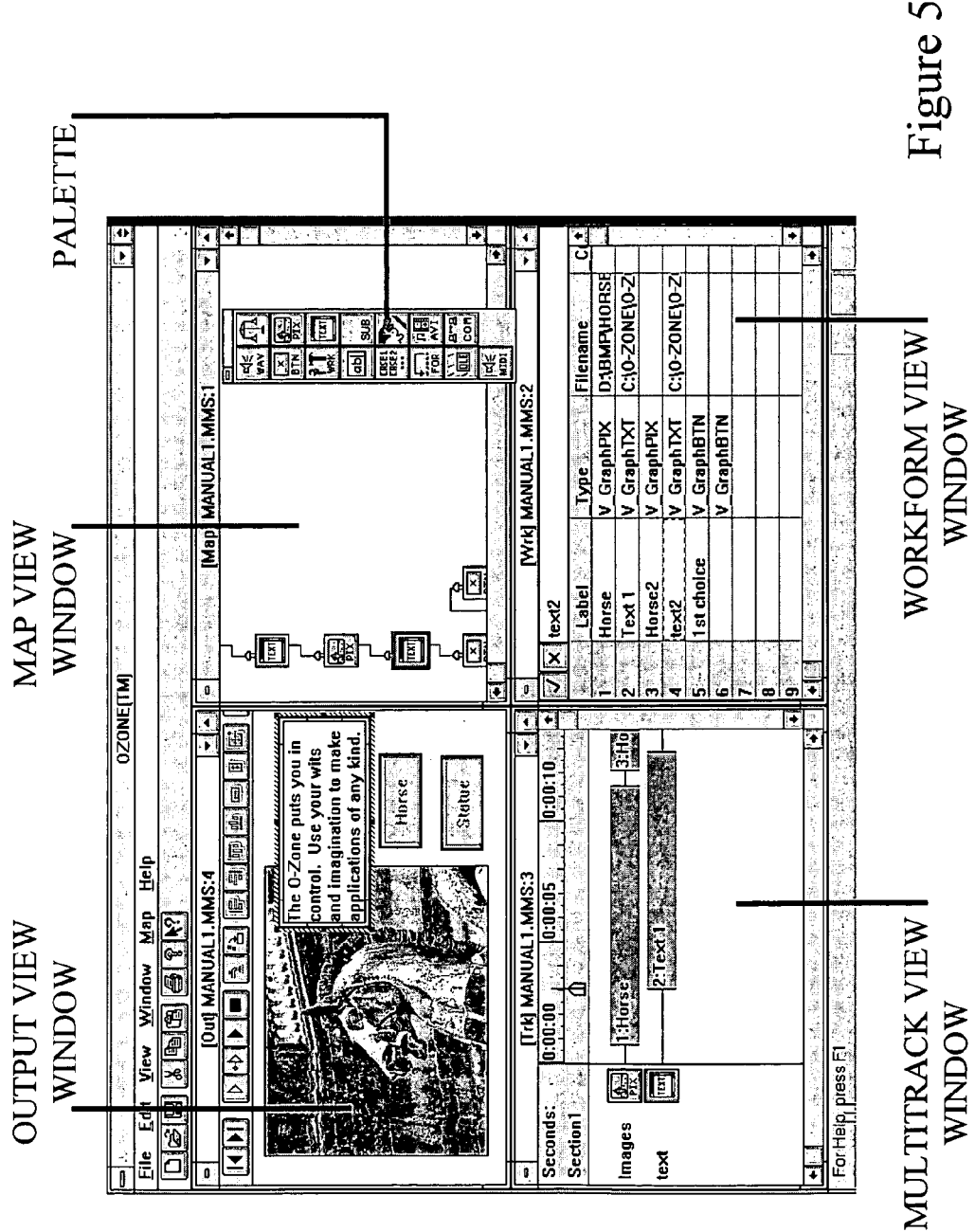
FIG. 5 shows for a simple program all four views, Output, Map, Multitrack, and Workform simultaneously displayed in separate windows.
Figure 6:
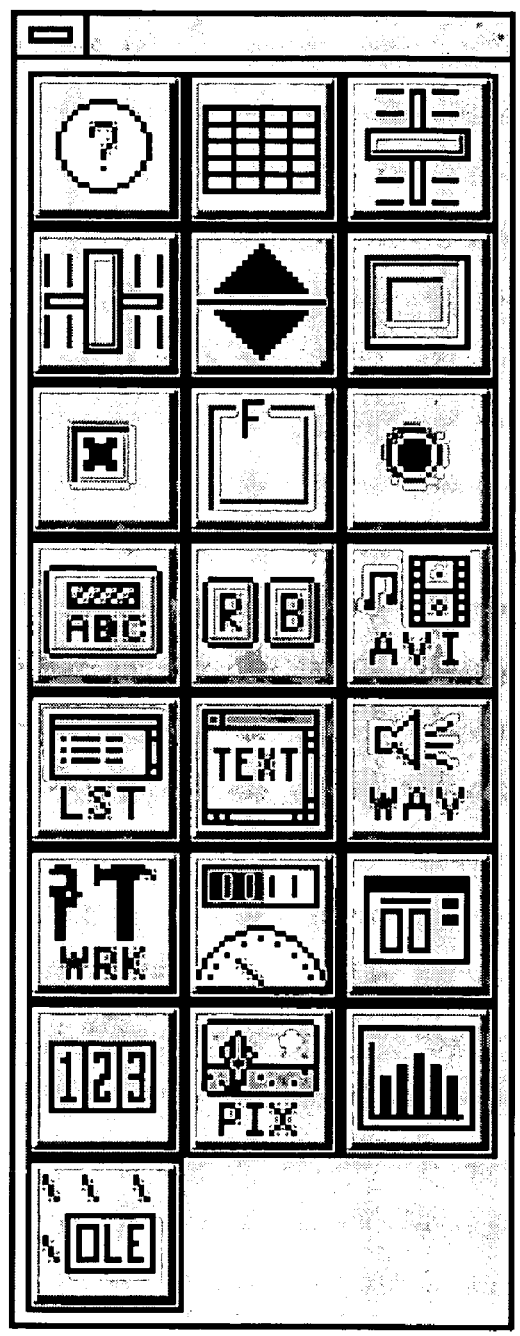
FIG. 6 shows a typical palette displaying the objects which are available to the user of the system.

FIG. 5 shows for a simple program all four views, Output, Map, Multitrack, and Workform simultaneously displayed in separate windows. In each view, the system of this invention permits development of the application using the same method of adding an object, interconnecting the object, and setting the objects properties. For instance, from a palette of objects, which displays a collection of icons that represent each object available to the system (such as the palette shown in FIG. 6), the user of the system drags an object into the view. The system simultaneously generates the underlying script which reflects the object and the properties associated with the object. The user's double click on the icon representing the object presents a menu list of the properties for that object the settings of which can be changed according to the user's requirements. If a separate dialog box is available for a particular property, clicking on the property gets the user to the dialog box. As a property setting is defined, the system records that definition in the associated underlying script. In addition, the system user can elect to have all the four views synchronized so that each view is updated for every change made in any view to the underlying script.

For example, in the Output view window the user might drag an icon representing an object which pulls a picture into the application program. The Output view window would then display the picture. If several pictures were to be presented in some order, several picture icons would be placed in the output view window. The user could set the order of presentation in the Workform view, but might more graphically do so in the Map view. In the Map view the user could arrange the picture icons in the order in which he/she wished the pictures to appear. In addition, in the Map view, the user could add conditional branches from picture to picture. The display timing for each picture could be set through the properties boxes or the Workform view, but might more graphically be done in the Multitrack view where each pictures duration and sequence would be indicated on parallel time lines. Finally, if the user wished to duplicate part of the application already created, he/she could use the Workform view to copy and move the underlying script. Clearly, the user of the system has the option of choosing the view most appropriate to the type to application under development. Since the system is a general purpose programming environment, the user will choose the view most appropriate for the application.

It should be noted that a very powerful feature of the Map view resides in its ability to permit the application developer to specify that one object in the sequence get or set data from/to another object. Thus, information exchange among objects is enabled as well as logical branching and program flow between objects.

In order to run a program developed in this manner from the script created by the authoring system, a ring time program is required which executes each object in the defined sequence with the defined property settings. The system of this invention provides such a run time program. Programs authored by the computer implemented application development system of this invention run faster under its run time program than to object oriented programs developed and run under Microsoft Visual Basic.

The computer implemented application development system of this invention is able to integrate and work with the objects in the above described manner because, in addition to the internal properties which are unique to each object and relate to the special work that each object does, the system wraps all objects in a kind of "envelope" of special properties that regulate how the objects act in the system. These special properties are:

| BranchTo | Kill |
| Break | Label |
| Comment | TimeMark |
| Create | Track |
| Create Type | Type |
| Destroy | WaitFor |
| Destroy Type | Group |

No other program in the prior art wraps standardized objects in this manner to achieve similar functionalities. This wrapping is also what permits the easy integration of additional objects into the system. Also, the system is so designed that the number of such special properties may be increased, if necessary, to adapt to any changes in future definition of objects.

As noted earlier, there are many different standards for the format of objects which have been devised by the proponents of object oriented programming. Many prior art authoring systems use objects with their own proprietary standard. However, the implementation of the authoring system of this invention disclosed in the software appendix has been designed to operate with "VBX custom controls" (objects) written to the Microsoft Visual Basic and Visual C++ standard. Presently, there are about 300 software vendors across the United States developing and selling such objects. Thus, a large number of objects written to the same standard are now available. The Microsoft Visual Control Pack contains representative objects and examples of code for different control types. Any object written to this standard may be used with the system of this invention. However, the methods employed by the present invention to wrap objects and integrate and run them directly from the system are equally applicable to objects written to other standards, and the scope of the present invention should not be considered limited by reference to the VBX control type object.

The source code in the software appendix does not contain any objects. As noted above, objects may be obtained through a large number of commercial suppliers. However, the system of this invention is sufficiently general to permit development of applications of all types. Specialized applications may be developed by importing appropriate standardized objects into the system. Thus, the system is infinitely extensible since it provides the necessary backbone environment for application development with objects written to a common standard.

While the software appendix discloses the source code for the computer implemented application development system of this invention in the WINDOWS and IBM-PC platform, the invention is not platform dependent and could also be implemented on the MacIntosh and other platforms. In order to run the source code disclosure of this invention on a digital computer, the following commercially available software programs should be available on the computer: Microsoft Visual C++ 1.5, Microsoft WINDOWS 3.1, and objects of the user's choice written to the Microsoft VBX Custom Control standard, Version 1.0. For Microsoft Visual C++ 1.5, file VBAPI.H has been renamed to VB_VBAPI.H.

The computer implemented application development system of this invention is presently available from V_GRAPH, Inc. under the trademark OZONE.

As noted above, standard objects may perform any function and can be utilized by the general purpose programming environment of this invention. Integration of these objects is achieved by wrapping the object with additional properties and permitting the user to assign values to the new properties as well as assigning values to the properties required by the object. The run time system manages the objects not only be transferring data from and to the objects as specified in the program structure, but also by looking ahead at the property values associated with an object so that it may do what is necessary to properly initiate the object. Thus, an instance of the object is created without any additional outside code being required simply by specifying the property values required by the object.

Since an object may perform any function, the objects may contain any of the normal programming constructs found in programming languages including, but not limited to, functions such as "if then" and other conditional looping. Since these constructs are in objects which are integrated into the final application, the system of this invention permits unlimited expansion of program capabilities; that is, it is infinitely extensible without the user of the system writing any code. Also, since the system of this invention places no restraints on the nature of the objects which may be implemented, even objects utilizing entire sublanguages are easily added.

A remarkable consequence of the fact that the system of the invention permits standard objects to be placed in a timeline is the fact that software applications performing parallel processing may be developed just as easily as other types of programs without the necessity of writing any linking code. Objects placed on the timeline and performing different tasks can be logically integrated and instantiated (timed communication and/or data flow) at any time relative to each other by the system of the invention. This feature of the system permits objects performing different functions to operate independently or in conjunction with each other without the requirement of writing specialized parallel processing timing code. The application development system of the invention contains all requisite functionalities necessary to instantiate, integrate, sequence, and provide communication between standardized object performing any type of task.

An alternative way to view the run time program of the present invention is to view it as a software container that displays and executes programmable objects based on a script that contains a listing of property values. The script is separate from any executable code and is interpreted by the container. This interpretation provides for the communication of data between objects and the timing of those objects. The script may come to the container from any manner of electronic storage including but not limited to hard driver, network server, or removable electronic storage device. The script and container combine to allow for interaction with an end user who may cause the loading of new scripts into that container, thus causing new objects to be executed within that container.

What is claimed is:

1. A computer implemented system employing a central processing unit with access to memory and storage for interpreting application scripts employing a run time program, one or more objects that may or may not have internal properties written to a known specification, and one or more scripts, in which the run time program, the objects, and the scripts can be maintained separately, comprising:
   a) means for dynamically wrapping objects written to a known specification, with additional properties beyond those properties internal to the objects; and
   b) means for utilizing the additional and/or internal properties to modify the execution of the objects.

2. The system of claim 1 in which the means for dynamically wrapping the objects allows the objects to fully access data outside the system.

3. A computer implemented system employing a central processing unit with access to memory and storage for interpreting application scripts employing a run time program, one or more objects written to a known specification and utilizing one or more scripts, in which the run time program, the objects and the scripts can be maintained separately, comprising:
   a) an interpreting run time program;
   b) scripts that contain property settings for the objects; and
   c) means for utilizing objects by specifying property values according to the script.

4. The system of claim 3 further comprising a means for communicating among objects through the exchange of property values.

5. The system of claim 4 further comprising a means for communicating among objects wherein an event generated by an object triggers an instance of another object.

6. The system of claim 3 further comprising a means for communicating among objects wherein an event generated by an object triggers an instance of another object.

7. A computer implemented system employing a central processing unit with access to memory and storage for interpreting application scripts employing a run time program, one or more objects written to a known specification and utilizing one or more scripts, in which the run time program, the objects and the scripts can be maintained separately, comprising:
   a) an interpreting run time program that has no logical or arithmetic operators;
   b) scripts that contain property settings for the objects; and
   c) means for utilizing objects by specifying property values according to the script.

8. The system of claim 7 further comprising a means for communicating among objects through the exchange of property values.

9. The system of claim 8 further comprising a means for communicating among objects wherein an event generated by an object triggers an instance of another object.

10. The system of claim 7 further comprising a means for communicating among objects wherein an event generated by an object triggers an instance of another object.

11. The system of claim 1, 3, 4, 5, 6, 7, 8, 9, or 10 further comprising a means for adding additional programming constructs or sub-programs by employing objects that perform the function of programming constructs or sub-programs-wherein expansion of program capabilities is achieved.

12. A computer implemented development and run time system employing a central processing unit with access to memory and storage employing one or more objects that may or may not have internal events written to a known specification which utilizes one or more scripts in which both the objects and the scripts can be maintained separately, utilizing a set of core functionalities comprising:
   a) means for dynamically wrapping the objects written to a known specification with additional events beyond those events internal to the objects;
   b) means for instantiating objects;
   c) means for integrating objects;
   d) means for sequencing objects; and
   e) means for providing communication among objects wherein the functionalities performed by the system during execution are determined by the objects used and the scripts.

13. A computer implemented run time system employing a central processing unit with access to memory and storage employing a run time program, one or more objects that may or may not have internal events written to a known specification utilizing a set of core functionalities which interprets one or more scripts, in which the run time program, the objects and the scripts can be maintained separately, comprising:
   a) means for dynamically wrapping the objects written to a known specification with additional events beyond those events internal to the objects;
   b) means for instantiating objects;
   c) means for integrating objects;
   d) means for sequencing objects; and
   e) means for providing communication among objects wherein the functionalities performed by the system during execution are determined by the objects used and the scripts.

14. A computer implemented system employing a central processing unit with access to memory and storage for employing one or more objects written to a known specification, having property values and event connections, which can be set in time and turned on or off of a visually perceptible display device comprising:
   a) means for setting the values of properties and connecting events;
   b) means for recording and maintaining a history of a plurality of properties settings and event connections as the settings and connections are changed; and
   c) means for traversing the history one change at a time wherein the property values and event connections may be edited from any point in the history.

15. A computer implemented system employing a central processing unit with access to memory and storage that interprets one or more scripts, which can be maintained separately, containing property values and event settings that distributes processing to objects that may or may not have internal properties or events written to a known specification, which can be maintained separately, provides and manages data flow among objects, and manages the execution of objects comprising:

a) means for dynamically wrapping the objects written to a known specification with additional properties and events beyond those properties and events internal to the objects; and b) means for utilizing the additional and/or internal properties to manage the execution of the objects and the additional and/or internal events to link and sequence the objects wherein the run time execution of the objects is determined by property values and events.

16. A computer implemented system employing a central processing unit with access to memory and storage employing two or more objects that may or may not have internal properties or events written to a known specification which implements parallel processing comprising:

a) means for dynamically wrapping objects written to a known specification with additional properties and events beyond those properties and events internal to the objects;

b) means for utilizing the additional and/or internal properties to manage the execution of the objects and the additional and/or internal events to link and sequence the objects; and c) means for specifying the temporal relationship among objects by placing the objects on one or more time lines wherein execution of the objects occurs concurrently and during which property values may be exchanged among the objects and events may be initiated.

17. An object oriented programming computer implemented system employing a central processing unit with access to memory and storage in which the function of programming constructs is achieved by utilizing objects that may or may not have internal properties or events written to a known specification comprising:

a) means for dynamically wrapping objects written to a known specification with additional properties and events beyond those properties and events provided internal to the object;

b) means for utilizing the additional and/or internal properties and events to link and sequence the objects; and c) means for specifying a list of property values and event settings wherein the execution of the objects is determined by the list of property values and event settings.

18. A computer implemented software method for interpreting application scripts employing a run time program, one or more objects that may or may not have internal properties written to a known specification, and one or more scripts, in which the run time program, the objects, and the scripts can be maintained separately, comprising the steps of:

a) dynamically wrapping objects written to a known specification with additional properties beyond those properties internal to the object; and b) utilizing the additional and/or internal properties to modify the execution of the objects.

19. A computer implemented software method for interpreting application scripts employing a run time program, one or more objects written to a known specification and utilizing one or more scripts, in which the run time program, the objects and the scripts can be maintained separately, comprising the steps of:

a) utilizing an interpreting run time program;

b) utilizing scripts that contain property settings for the objects; and c) utilizing objects by specifying property values according to the script.

20. The software method of claim 19 further comprising the step of communicating among objects through the exchange of property values.

21. The software method of claim 20 further comprising the step of communicating among objects wherein an event generated by an object triggers an instance of another object.

22. The software method of claim 19 further comprising the step of communicating among objects wherein an event generated by an object triggers an instance of another object.

23. A computer implemented software method for interpreting application scripts employing a run time program, one or more objects written to a known specification and utilizing one or more scripts, in which the run time program, the objects and the scripts can be maintained separately, comprising the steps of:

a) utilizing an interpreting run time program that has no logical or arithmetic operators;

b) utilizing scripts that contain property settings for the objects; and c) utilizing objects by specifying property values according to the script.

24. The software method of claim 23 further comprising the step of communicating among objects through the exchange of property values.

25. The software method of claim 24 further comprising the step of communicating among objects wherein an event generated by an object triggers an instance of another object.

26. The software method of claim 23 further comprising the step of communicating among objects wherein an event generated by an object triggers an instance of another object.

27. The software method of claim 18, 19, 20, 21, 22, 23, 24, 25 or 26 further comprising the step of adding additional programming constructs or sub-programs by employing objects that perform the function of programming constructs or sub-program wherein expansion of program capabilities is achieved.

28. A computer implemented development and run time software method employing one or more objects for developing and executing an application which utilizes one or more scripts in which both the objects and the scripts can be maintained separately, and utilizing a set of core functionalities comprising the steps of:

a) instantiating objects;

b) integrating objects;

c) sequencing objects; and d) providing communication among objects wherein the functionalities performed by the software method during execution are determined by the objects used and the scripts.

29. A computer implemented run time software method employing one or more objects written to a known specification for executing an application utilizing a set of core functionalities which interprets one or more scripts, in which the run time program, the objects and the script can be maintained separately, comprising the steps of:

a) instantiating objects;

b) integrating objects;

c) sequencing objects; and d) providing communication among objects wherein the functionalities performed by the software method during execution are determined by the objects used and the scripts.

30. A computer implemented software method for employing one or more objects written to a known specification, having property values and event connections, which can be set in time and turned on or off of a visually perceptible display device comprising the steps of:
   a) setting the values of properties and connecting events;
   b) recording and maintaining a history of a plurality of properties settings and event connections as the settings and connections are changed; and
   c) traversing the history one change at a time
   wherein the property values and event connections may be edited from any point in the history.

31. A computer implemented run time software method employing objects that may or may not have internal properties or events which interprets a script containing property values and event settings, in which the run time program, the objects and the script can be maintained separately, and dynamically executes the objects comprising the steps of:
   a) wrapping objects with additional properties and events beyond those properties and events internal to the objects;
   b) utilizing the additional and/or internal properties and events to link and sequence the objects; and
   c) reading one or more sets of property values and event settings maintained separately from the run time system and the objects
   wherein the execution of the objects is determined by the property values and event settings in the script.

32. The software method of claim 31 further comprising the step of adding programming constructs or sub-programs utilizing objects.

33. A computer implemented software method that interprets one or more scripts, which can be maintained separately, containing property values and event settings that distributes processing to objects that may or may not have internal properties or events written to a known specification, which can be maintained separately, provides and manages data flow among objects, and manages the execution of objects comprising the steps of:
   a) dynamically wrapping the objects written to a known specification with additional properties and events beyond those properties and events internal to the objects; and
   b) utilizing the additional and/or internal properties to manage the execution of the objects and the additional and/or internal events to link and sequence the objects
   wherein the execution of the objects is determined by the property values and events.

34. A computer implemented software method employing two or more objects that may or may not have internal properties or events written to a known specification which implements parallel processing comprising the steps of:
   a) dynamically wrapping the objects written to a known specification with additional properties and events beyond those properties and events internal to the object;
   b) utilizing the additional and/or internal properties to manage the execution of the objects and the additional and/or internal events to link and sequence the objects; and
   c) specifying the temporal relationship among objects by placing the objects on one or more time lines
   wherein execution of the objects occurs concurrently and during which property values may be exchanged among the objects and events may be initiated.

35. A computer implemented object oriented software programming method in which the function of programming constructs is achieved by utilizing objects that may or may not have internal properties or events written to a known specification comprising the steps of:
   a) dynamically wrapping the objects written to a known specification with additional properties and events beyond those properties and events provided internal to the object;
   b) utilizing the additional and/or internal properties and events to link and sequence the objects; and
   c) specifying a list of property values and event settings
   wherein the execution of the objects is determined by the list of property values and event settings.

36. A computer implemented software method for employing one or more standardized objects written to a known specification with properties not internal to the standardized objects comprising the steps of:
   a) using a wrapper object, dynamically wrapping one or more standardized objects with additional properties beyond those properties internal to the one or more standardized objects; and
   b) utilizing the additional and/or internal properties to control the standardized objects.

37. A computer implemented software method for employing one or more standardized objects that may or may not have internal events written to a known specification with events not internal to the standardized objects comprising the steps of:
   a) using a wrapper object, dynamically wrapping one or more standardized objects with additional events beyond those events internal to the one or more standardized objects; and
   b) utilizing the additional and/or internal events to control the one or more standardized objects.

38. A computer implemented system employing a central processing unit with access to memory and storage for interpreting application scripts employing a run time program, one or more objects that may or may not have internal events written to a known specification, and one or more scripts, in which the run time program, the objects, and the scripts can be maintained separately, comprising:
   a) means for dynamically wrapping the objects written to a known specification with additional events beyond those events internal to the objects; and
   b) means for utilizing the additional and/or internal events to link and sequence the objects.

39. A computer implemented software method for interpreting application scripts employing a run time program, one or more objects that may or may not have internal events written to a known specification, and one or more scripts in which the run time program, the objects, and the scripts can be maintained separately, comprising the steps of:
   a) using a wrapping object, dynamically wrapping the object written to a known specification with additional events beyond those events internal to the object; and
   b) utilizing the additional and/or internal events to link and sequence the object.

40. A computer implemented run time program method to employ one or more objects that may or may not have internal properties written to a known specification with properties, not native to the objects, specified by one or more scripts comprising the steps of:

a) using an object available to the run time program, dynamically wrapping the object written to a known specification with additional properties; and b) utilizing the additional and/or internal properties to modify the execution of the object written to a known specification.

41. The method of claim 40 in which the run time program, the objects, and the scripts can be maintained separately.

42. The method of claim 40 in which programming constructs or sub-programs can be implemented in the run time program by utilizing objects that execute the constructs or sub-programs.

43. The method of claim 41 in which programming constructs or sub-programs can be implemented in the run time program by utilizing objects that execute the constructs or sub-programs.

44. A computer implemented run time program method to employ one or more objects that may or may not have internal events written to a known specification with events, not native to the objects, specified by one or more scripts comprising the steps of:

a) using an object available to the run time program, dynamically wrapping the object written to a known specification with additional events; and b) utilizing the additional and/or internal events to link and sequence the object written to a known specification.

45. The method of claim 44 in which the run time program, the objects, and the scripts can be maintained separately.

46. The method of claim 45 in which the programming constructs or sub-programs can be implemented in the run time program by utilizing objects that execute the constructs or sub-programs.

47. The method of claim 44 in which programming constructs or sub-programs can be implemented in the run time program by utilizing objects that execute the constructs or sub-programs.

48. A computer implemented method for interpreting one or more application scripts employing a runtime program comprising the steps of:

a) loading one or more application scripts that can be maintained separately from the runtime program;

b) according to information stored in the application script, loading one or more objects that may or may not have internal properties that can be maintained separately from the runtime program and the scripts;

c) using an object available to the run time program, dynamically wrapping one or more objects written to a known specification with additional properties beyond those properties internal to the object; and d) utilizing the additional and/or internal properties to modify the execution of the objects based on the values found in the script.

49. The method of claim 48 in which the wrapped objects function as program constructs.

50. The method of claim 49 in which the wrapped objects access data outside the runtime program.

51. The method of claim 48 in which the wrapped objects function as sub-programs.

52. The method of claim 51 in which the wrapped objects access data outside the runtime program.

53. The method of claim 48 in which the wrapped objects access data outside the runtime program.

54. A computer implemented object oriented software programming method in which the function of programming constructs is achieved by utilizing objects written to a known specification comprising the steps of:

a) instantiating a first object that performs the function of a programming construct;

b) utilizing the first object's events to link to one or more additional objects wherein the order of the execution of the additional objects is determined by the list of property values and event settings in the script and the execution of the first object.

* * * * *